United States Patent [19]
Rhee et al.

[11] Patent Number: 5,081,625
[45] Date of Patent: Jan. 14, 1992

[54] WATCHDOG CIRCUIT FOR USE WITH A MICROPROCESSOR

[75] Inventors: Dennis W. Rhee, Bloomfield Hills; John C. Saussele; Adrian Madau, both of Dearborn, all of Mich.

[73] Assignee: Ford Motor Company, Dearborn, Mich.

[21] Appl. No.: 253,454

[22] Filed: Oct. 5, 1988

[51] Int. Cl.$^5$ ............................................. G06F 11/00
[52] U.S. Cl. ...................................... 371/16.3; 371/66
[58] Field of Search .................. 371/16.3, 15.1, 16.1, 371/16.4, 61, 60, 66, 63, 62

[56] References Cited

U.S. PATENT DOCUMENTS

| | | |
|---|---|---|
| 3,795,800 | 3/1974 | Nimmo ................................. 371/16.3 |
| 4,488,303 | 12/1984 | Abramovich ....................... 371/16.3 |
| 4,541,050 | 9/1985 | Honda ................................. 371/16.3 |
| 4,586,179 | 4/1986 | Sirazi ................................... 371/16.3 |
| 4,586,180 | 4/1986 | Anders ................................. 371/16.3 |
| 4,600,987 | 7/1986 | Nambudiri ........................ 371/16.3 |
| 4,728,861 | 3/1988 | Kurihara ............................. 340/507 |

Primary Examiner—Michael R. Fleming
Attorney, Agent, or Firm—Paul K. Godwin, Jr.; Roger L. May

[57] ABSTRACT

The watchdog timer circuit which performs both the power-up initialization and program resetting function to an associated microprocessor utilizing a single astable multivibrator circuit with a single pair of complementary transistors and a single capacitor to affect timing and regenerative feedback between the transistors.

2 Claims, 3 Drawing Sheets

WATCHDOG CIRCUIT FOR USE WITH A MICROPROCESSOR

BACKGROUND OF THE INVENTION

1. Field of the Invention

The present invention is directed to the field of microprocessor control systems and more specifically to the area of a circuit which provides reset signals to the microprocessor upon restoration of power and in the event of program lock up.

2. Background Information

Watchdog timers are commonly used in association with microprocessor control devices. Such timers function to monitor the program operation and provide a reset signal whenever the program locks up (stops running). Watchdog timers are normally combined with other dedicated circuits to ensure that a reset signal is provided to the microprocessor during a power-up period, when operational voltages are first applied. After a sufficient period, following power-up, the reset signal is removed and the microprocessor is allowed to initialize to start its main program and output a corresponding status signal. The watchdog timer circuit monitors the status signal pulse train output from the microprocessor to cause a reset signal to be applied to the microprocessor in the event the pulse train ceases.

Microprocessors (also called microcomputers) conventionally include an initialization subroutine which, after a sufficient time delay to allow all power levels to be stabilized, sets the program counter to a zero count and addresses the location of its read only memory in accordance with the zero count of the program counter. The contents of the read only memory location allows the initialization program to define and establish initial conditions for microprocessor operation. In order to commence the initialization process, the microprocessor requires the appropriate voltage from an associated power supply followed by the predetermined reset signal applied to a dedicated input/output port. Subsequent to the initialization subroutine, the microprocessor begins its main program sequence and provides a status signal in the form of a pulse train that is output on a dedicated port at a predetermined frequency and duty cycle in sequence with the program execution steps performed within the microprocessor. In the event of a program failure due to fluctuating voltages or other transients which cause the program to stop, the status signal pulse train will also stop. The function of the watchdog timer is to then apply a reset signal to the microprocessor and cause the initialization subroutine to run and subsequently start the main program.

U.S. Pat. No. 4,586,179 teaches the use of a watchdog timer circuit that is in combination with a separate source voltage level detector circuit. The two separate functions are gated through a single triggering circuit to provide separate resets to the microprocessor. Upon power-up, the source voltage level detector biases the triggering circuit in such a way as to hold the reset terminal at a low level which corresponds to the $\overline{\text{RESET}}$ signal. When the source voltage level reaches a predetermined value, a first monostable multivibrator in the watchdog timer is triggered and outputs a biasing voltage to the trigger circuit so that the trigger circuit continues to hold the reset level low for a predetermined time period as determined by a RC network that holds the first monostable multivibrator in its unstable state. Subsequently, after the initialization period, the status signal output from the microprocessor is input to a second monostable multivibrator of the watchdog timer circuit. The train of pulses is said to hold the second monostable multivibrator in its unstable state. However, when the status signal ceases, the monostable multivibrator 42 switches to its unstable state and causes the first multivibrator 44 to enter its unstable state for a period of time as determined by the RC network and cause the $\overline{\text{RESET}}$ signal to be input to the microprocessor for that period of time.

The watchdog timer circuit of the '179 patent provides one reset signal for each suspension of status signals from the microprocessor. Therefore, if the first reset signal fails to restart the microprocessor, no further reset signals are generated.

Further improvements to watchdog timers has resulted in the use of a comparator circuit configured as an astable multivibrator with resistive feedback to compare the status signal from the microprocessor with a reference level and to provide the appropriate reset signals.

SUMMARY OF THE INVENTION

It is an object of the present invention to provide an improved circuit that achieves both the initial power-up reset and appropriate program reset signals to an associated microprocessor with a watchdog timer circuit.

It is another object of the present invention to provide a watchdog timer circuit which repeats the application of program reset signals in the event the previous reset signal failed to cause the associated microprocessor to commence operation.

It is a further object of the present invention to achieve the above mentioned operations utilizing a single astable multivibrator circuit with capacitive feedback.

It is a still further object of the present invention to provide a low cost and reliable watchdog timer circuit utilizing a single pair of active switching components and a single capacitor to both control cycle timing and provide regenerative feedback between the switching components.

The watchdog timer circuit of the present invention is connected to an associated microprocessor to monitor a status signal output from the microprocessor. That status signal constitutes a series of pulses having a known duty cycle and frequency corresponding to the frequency in which program instructions are performed within the microprocessor. The circuit includes a single astable multivibrator circuit with a single pair of complementary transistors.

An astable multivibrator has no preferred stable state. It has two output states (high and low) and will switch from one state to the other and spend predetermined periods of time in each state before switching to the other when the circuit is in a "free running" condition.

In this case, the astable multivibrator circuit is directly connected to a microprocessor reset input port to provide a $\overline{\text{RESET}}$ signal ("low" level) when the multivibrator circuit is in its first state. (Other installations may employ microprocessors that require high level signals for reset. In such cases, an adaptation of the disclosed circuit will provide the inverted signal levels.)

When power is first applied to the circuit, it is in its first state and remains in that state for a predetermined initial time period that is selected as being sufficient for the associated microprocessor to stabilize. Following the predetermined initial time period in its first state, the astable multivibrator circuit switches to a second state, thereby removing the $\overline{\text{RESET}}$ signal and providing a non-reset signal ("high" level) to the microprocessor.

An AC coupling and rectifier circuit is connected to the input of the astable multivibrator to provide the status signal that is normally output from the microprocessor following a period of initialization. If the status signal is received from the microprocessor following that period of initialization, the multivibrator remains in its second state as long as the status signal is received from the microprocessor.

In the event of a failure within the microprocessor that causes a termination of the status signal for a predetermined failure mode time period, the multivibrator circuit switches to its first state and provides the $\overline{\text{RESET}}$ signal for a predetermined program reset time period before switching back to its second state. The multivibrator circuit remains in the second state for at least a predetermined detection time period. The predetermined detection time period is selected as that which is sufficient to allow the microprocessor to proceed through its initialization subroutine and cause the main program to start and transmit the status signal to the watchdog timer circuit. Upon receipt of the status signal, the multivibrator circuit remains biased in that second state until such time as the status signal is again interrupted.

In the even the status signal does not commence following application of a $\overline{\text{RESET}}$ signal, the multivibrator circuit will time out in its second state for the predetermined detection time period and then switch to again provide a $\overline{\text{RESET}}$ signal to the microprocessor for a predetermined program reset time period. This is repeated until such time as the status signal is again received from the microprocessor or the power is turned off.

DESCRIPTION OF THE PREFERRED EMBODIMENT

Figure 1:
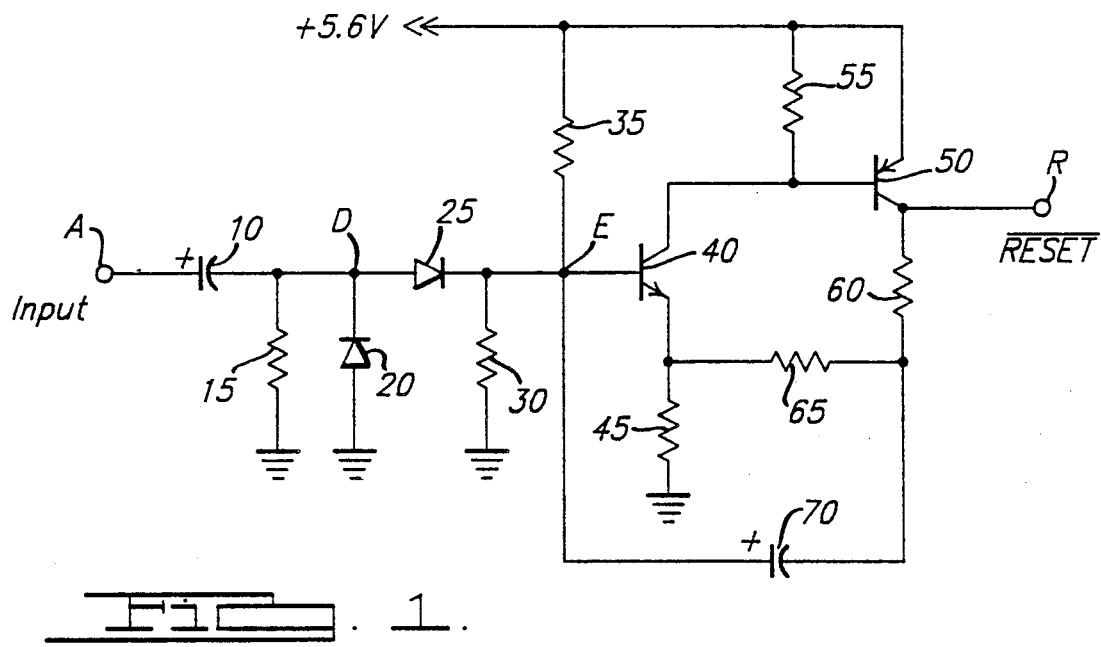
FIG. 1 is a schematic diagram of the preferred embodiment of the invention.

The embodiment of the watchdog timer circuit shown in FIG. 1 is preferred for its simplicity and reliability due to the low number of components used, while at the same time providing the essential features of both a watchdog timer and a power-up detector. The watchdog timer circuit comprises an astable multivibrator circuit containing a single pair of complementary NPN and PNP transistors and a single capacitor to provide regenerative feedback between the transistors. The output of the astable multivibrator is provided from the collector of the PNP transistor while the input is provided to the base of the NPN transistor. In the event an opposite logic level output is required to provide the appropriate reset signal to an associated microprocessor, the voltages and placement of the complementary transistors can be reversed, while retaining the astable characteristics and improvements which constitute the invention.

The circuit shown in FIG. 1 is associated with a regulated 5.6 volt power supply and a microprocessor. Both associated circuits are conventional and, for convenience, are not shown herein. Although specific voltage levels, time periods and signal frequencies are described herein with respect to the preferred embodiment, it should be understood that the invention is equally applicable to situations where different voltage levels, time periods and signal frequencies are needed to achieve the same results.

The input terminal "A" which is connected to the microprocessor to receive the status signal, is also connected to a coupling capacitor 10. The other side of the capacitor 10 is connected to a resistor 15, the cathode of a clamping diode 20 and the anode of a rectifier diode 25 at a defined node "D". The capacitor 10 provides AC coupling of the bi-level status signal so that a suspension of the status signal in either of its high or low level states will be equally detectable by the watchdog timer circuit. Resistor 15 provides a shunt path for any DC leakage current that occurs across coupling capacitor 10. Clamping diode 20 has its cathode connected to the node D and its anode connected to ground to provide a lower reference level of −0.6 volts to the normally 4 volt peak-to-peak bi-level status signal coupled across capacitor 10. The cathode of the rectifier diode 25 is connected to a designated node "E" at the base of NPN input transistor 40.

A voltage divider is established with resistors 30 and 35 between the connection to the 5.6 volt power supply and ground. The junction of the resistors 30 and 35 is connected to node E in order to provide a desired charging voltage for controlling the switching of the transistor 40. The ratio of resistance values for resistor 35 with respect to resistor 30 is such that node E, without the influence of the status signal or the regenerative feedback from capacitor 70 provides a voltage level to the base of transistor 40 that is above its turn-on threshold (approximately 0.6 volts) and below its turn-off threshold (approximately 1.3 volts). The collector of the transistor 40 is connected through a resistor 55 to the 5.6 volt power supply connection and is also connected to the base of PNP output transistor 50. The emitter of transistor 40 is connected to ground through resistor 45.

The emitter of transistor 50 is connected directly to the 5.6 volt power supply and the collector is connected to the output node "R" (the reset terminal of the associated microprocessor, not shown). A ground path is provided to the collector of the transistor 50 through resistors 60, 65 and 45. The voltage divider circuit formed by resistors 60, 65 and 45 serve to provide DC stability to the circuit and provide reliable and predictable switching over a wide range of temperatures. Capacitor 70 is connected between the junction of resistors 60 and 65 and the node E at the base of the transistor 40 to provide positive regenerative feedback for the astable multivibrator circuit.

Figure 2:
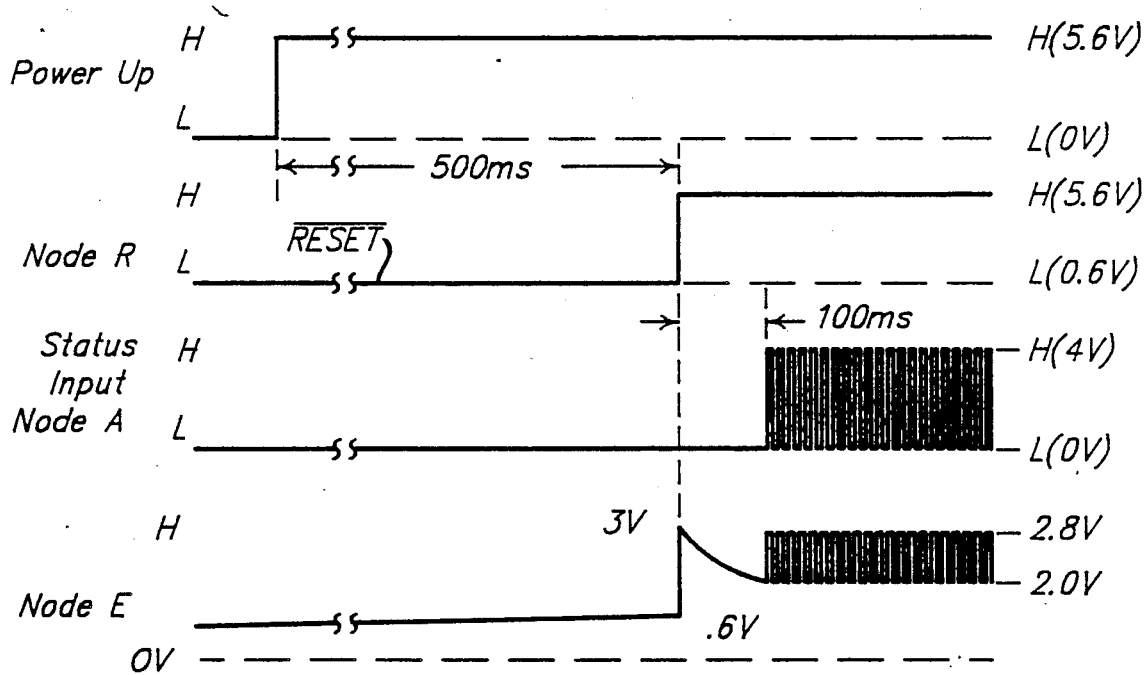
FIG. 2 is a waveform diagram illustrating the voltage levels at various points within the circuit shown in FIG. 1 during the power-up phase of operation.

The operation of the circuit shown in FIG. 1 is described with reference to the waveform diagrams of FIG. 2. Upon the initial application of the 5.6 volts to the circuit shown in FIG. 1, the base of transistor 40 at node E is at 0 volts due to the initial charging of capacitor 70. The transistor 40 is maintained in its "OFF" (nonconducting) state during this predetermined initial time period while capacitor 70 is charging and, in turn, biases the transistor 50 in its OFF (nonconducting) state. With transistor 50 in its OFF state, the node R is maintained at a ground potential which is provided to the associated microprocessor as an initializing $\overline{\text{RESET}}$ level signal for the duration of this predetermined initial time period.

Over the period of 500 milliseconds (the predetermined initial time period in this embodiment), the charge level at node E accumulates to approximately 0.6 volts. At that level, the transistor 40 is biased in its "ON" (conducting) state. Simultaneously, the switching on of the transistor 40 causes the transistor 50 to be biased to is ON (conducting) state and to shift the output at the R terminal from the low $\overline{\text{RESET}}$ level to a high level (non-reset condition). The current flow then occurring through the resistors 60, 65 and 45 raises the voltage present at the side of the capacitor 70 connected to the junction between the resistors 60 and 65 to approximately 2.4 volts. The 0.6 volt charge existing across the capacitor 70 at the time transistors 40 and 50 are switched on, adds to 2.4 volts and causes the base of transistor 40 to jump to 3 volts.

After approximately 100 milliseconds into the multivibrator's second state, the microprocessor should have completed its initialization subroutine and commenced running the main program. At that point, the status signal is expected to be present at node A. The status signal is a bi-level (4.0 volts peak-to-peak) train of pulses having an approximate 50% duty cycle and, in this case, a frequency of 200 hertz.

The status signal is AC coupled via capacitor 10, shifted to be referenced at −0.6 volts by clamping diode 20, and rectified by diode 25 to have an upper peak limit of 2.8 volts at node E. The presence of the status signal at the input node A and on node E causes the base of input transistor 40 to remain at a level above 1.3 volts and thereby maintain both transistors 40 and 50 in their conducting ON states. Therefore, the astable multivibrator circuit remains in its second state for as long as the status signal is detected.

Figure 3:
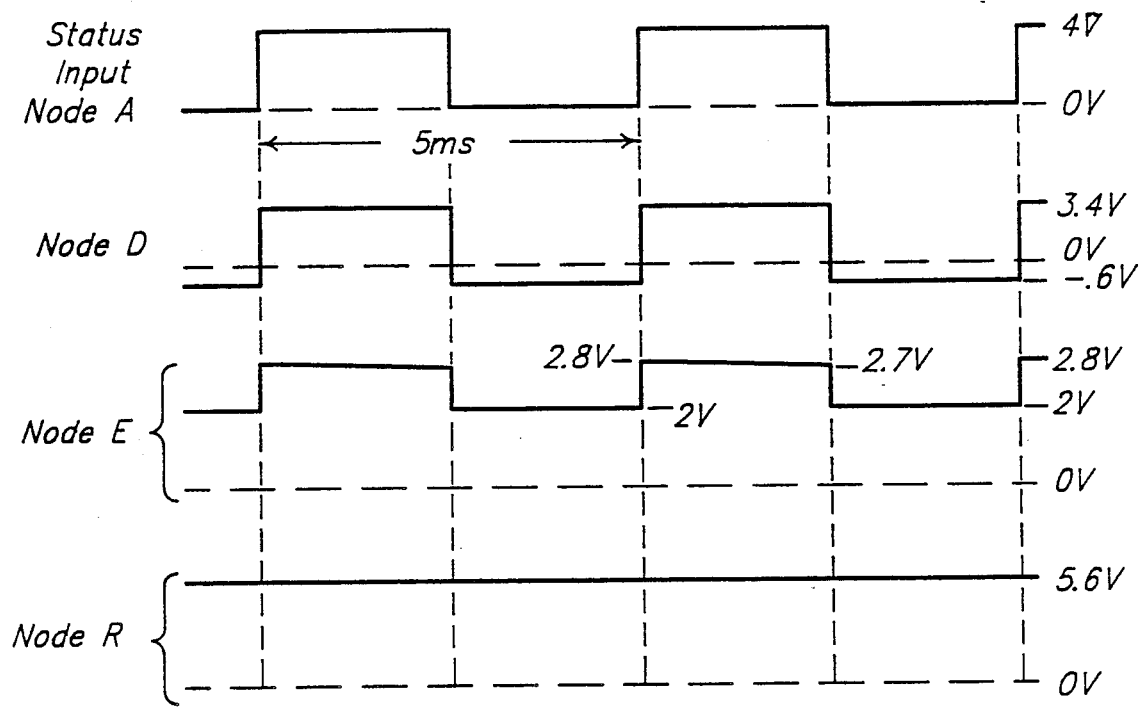
FIG. 3 is an expanded waveform diagram showing the voltage levels at various designated points within the circuit shown in FIG. 1 during normal operating conditions of the associated microprocessor.

FIG. 3 is an expanded waveform diagram illustrating the status input signal and its effects at various nodes within the circuit. As mentioned above, the microprocessor is programmed, in this case, to output the status signal as a series of pulses having a 50% duty cycle. A full cycle of a status signal is approximately 5 milliseconds to provide a frequency of 200 hertz. The peak-to-peak voltage of the pulses is approximately 4 volts referenced at 0 volts at node A. When measured at node D, the effect of the clamping diode 20 is to reference the lower peak of the status input signal to −0.6 volts and the upper peak at 3.4 volts.

In the present configuration, as long as the base of transistor 40 is above approximately 1.3 volts (i.e. maintaining a base to emitter difference of 0.6 volts), transistor 40 and transistor 50 will remain in their ON states and cause the astable multivibrator to remain in its second state providing a high voltage level to be maintained on node R.

Figure 4:
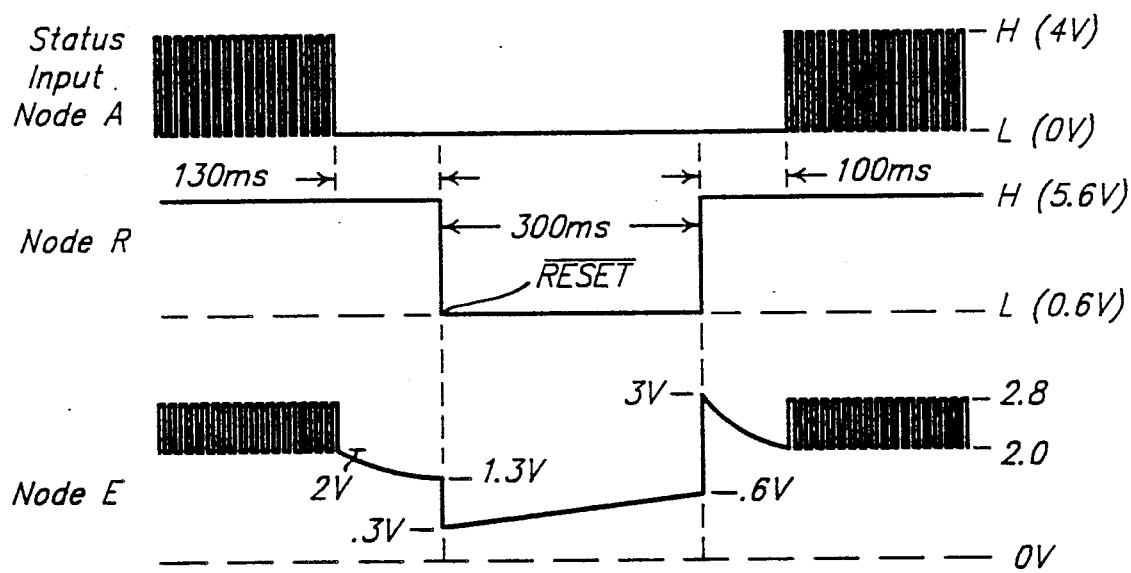
FIG. 4 is a waveform diagram showing the voltage levels present at various points within the circuit shown in FIG. 1 when the status signal is terminated at a low level.
Figure 5:
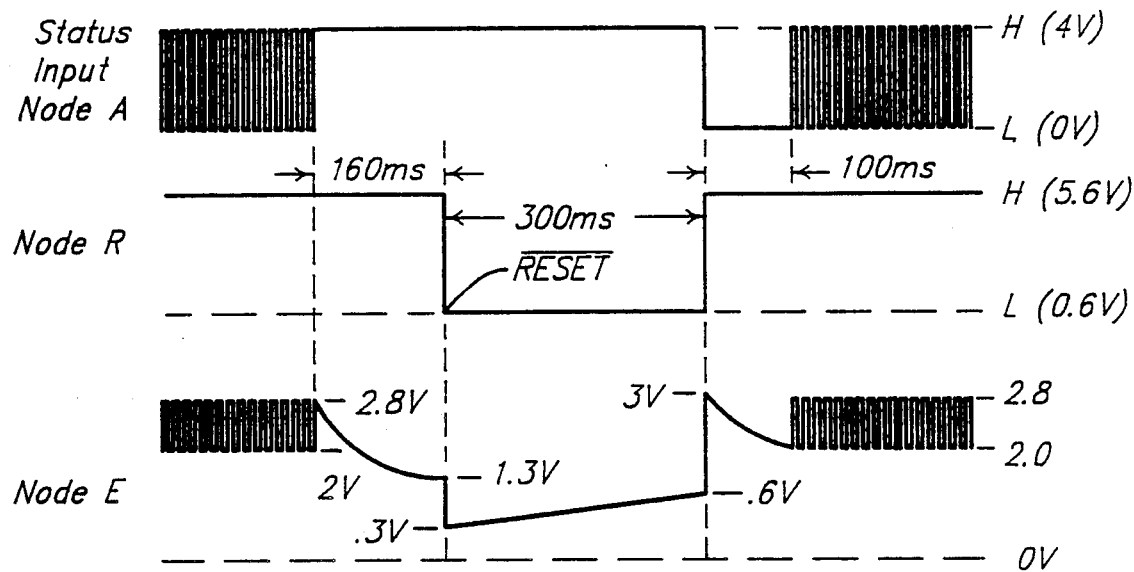
FIG. 5 is a waveform diagram showing the voltage levels present at various points within the circuit shown in FIG. 1 when the status signal is terminated at a high level.

FIGS. 4 and 5 are waveform diagrams illustrating the various voltage levels that appear within the circuit when the status input signal is terminated at either respective low or high levels because of a program malfunction in the associated microprocessor.

In the case of FIG. 4, the status input signal is terminated at its low level. At that point, node E is at a 2 volt level and the transistor 40 remains in its ON state since it is still above the 1.3 volt turn-off threshold level. After approximately 130 milliseconds, following the suspension of the status input signal, the voltage present at node E discharges from 2 volts to approximately 1.3 volts, at a rate determined by the capacitor 70 and resistors 30 and 35. As soon as the voltage at node E drops to approximately 1.3 volts, the transistors 40 and 50 switch to their OFF (nonconducting) states; placing the astable multivibrator circuit in its first state and applying the $\overline{\text{RESET}}$ signal at node R to the microprocessor. The voltage present at node E is then instantaneously driven from 1.3 volts to 0.3 volts by the regenerative effects across capacitor 70 due to the changes which occur at the junction between resistors 60 and 65 when transistor 50 becomes non-conducting. The voltage divider formed by resistors 30 and 35 drives node E and the capacitor 70. It takes approximately 300 milliseconds for capacitor 70 to charge to 0.6 volts. That 300 milliseconds becomes the predetermined program reset time period for which the $\overline{\text{RESET}}$ signal is applied to the microprocessor. When the node E reaches the charge level of approximately 0.6 volts, transistor 40 switches to its ON condition and the voltage level at node E is regeneratively driven to a 3 volt level. As with the power-up initialization, after approximately 100 milliseconds following the termination of the $\overline{\text{RESET}}$ signal, the microprocessor will normally output a status signal and maintain the astable multivibrator circuit in its second state.

In FIG. 5 the fault condition of the status signal is shown as suspended at its high level. However, the AC coupling of the status signal blocks the D.C. component and no signal level is provided across diode 25. Node E is charged to a 2.8 volt level at the time of status signal termination. The time for capacitor 70 to discharge and lower the voltage to approximately 1.3 volts at node E is approximately 160 milliseconds. At that point the astable multivibrator circuit switches to its first state for approximately 300 milliseconds and applies the $\overline{\text{RESET}}$ signal at node R to the microprocessor. At the completion of the application of the $\overline{\text{RESET}}$ signal, the microprocessor will be initialized and approximately 100 milliseconds later the status input signal should again be present at node A.

Figure 6:
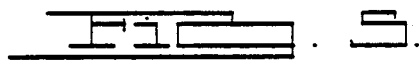
FIG. 6 is a waveform diagram illustrating the astable nature of the multivibrator circuit employed in the present invention and the voltage levels present at various points within the circuit shown in FIG. 1 which would occur if the multivibrator were allowed to be in a free running condition.

FIG. 6 is a waveform diagram illustrating the various voltage levels that would appear in the present invention, in the event no status input signals were to appear at node A. In that event, the $\overline{\text{RESET}}$ signal would be repeatedly applied at node R for 300 milliseconds while the multivibrator circuit is in its first astable state and be separated by 200 millisecond intervals while the multivibrator is in its second astable state.

Components used in the described circuit are as follows:

| | |
|---|---|
| Capacitor 10 | 10μ fd |
| Resistor 15 | 10K ohms |
| Resistor 30 | 75K ohms |
| Resistor 35 | 330K ohms |
| Resistor 45 | 5.1K ohms |
| Resistor 55 | 51K ohms |
| Resistor 60 | 27K ohms |
| Resistor 65 | 2.2K ohms |
| Capacitor 70 | 10μ fd |
| Transistor 40 | MPSA06 |
| Transistor 50 | MPSA56 |

It will be apparent that many modifications and variations may be implemented without departing from the scope of the novel concept of this invention. Therefore, it is intended by the appended claims to cover all such modifications and variations which fall within the true spirit and scope of the invention.

We claim:

1. A watchdog timer for use in conjunction with a programmed microprocessor to monitor the presence of a status signal output from said microprocessor whenever said program is running comprising:

means connected to said microprocessor and controlled by the presence of said status signal to provide an initializing reset level signal to said microprocessor for a predetermined initial time period immediately following the application of electrical power to said microprocessor, to provide a correspondingly continuous nonreset level signal to said microprocessor as long as said status signal is present, and upon the occurrence of the absence of said status signal for at least a predetermined failure mode time period, to periodically provide said reset level signal for a predetermined program reset time period in alternation with said nonreset level signal for a predetermined detection time period to said microprocessor until said status signal becomes present;

wherein said controlled means includes an astable multivibrator circuit that operates to provide said initial reset level signal for said predetermined initial time period and thereafter operates in the absence of an input signal occurring in the absence of said status signal to switch between two distinct states whereby said circuit provides said reset level signal output when in its first state and said nonreset level signal when in its second state, said switching occurs at a predetermined cycle rate in which the length of each cycle corresponds to the sum of said predetermined program reset time period and said predetermined detection time period, and said astable multivibrator continues to cycle until it receives said input signal.

2. A watchdog timer as in claim 1, wherein said status signal is a bi-level pulse train having a cycle rate that is greater than the operational cycle rate of said multivibrator circuit and said watchdog timer further includes means between said microprocessor and said multivibrator circuit to AC couple and rectify said bi-level pulse train above a level that will provide an input signal sufficient to hold said multivibrator in its second state.

* * * * *